(12) United States Patent
Bock et al.

(10) Patent No.: US 10,408,099 B2
(45) Date of Patent: Sep. 10, 2019

(54) SWITCHING MEMBRANE FOR A PRESSURE CONTROL VALVE AND A PRESSURE CONTROL VALVE

(71) Applicant: MANN+HUMMEL GMBH, Ludwigsburg (DE)

(72) Inventors: Lukas Bock, Bietigheim-Bissingen (DE); Jens Burkhardt, Freiberg (DE); Volker Kuemmerling, Bietigheim-Bissingen (DE); Thomas Jessberger, Asperg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 30 days.

(21) Appl. No.: 15/475,579

(22) Filed: Mar. 31, 2017

(65) Prior Publication Data

US 2017/0284244 A1 Oct. 5, 2017

(30) Foreign Application Priority Data

Apr. 1, 2016 (DE) ........................ 10 2016 003 767

(51) Int. Cl.
*F16K 7/12* (2006.01)
*F16K 7/17* (2006.01)
(Continued)

(52) U.S. Cl.
CPC ...... *F01M 13/023* (2013.01); *F01M 13/0011* (2013.01); *F16K 7/126* (2013.01);
(Continued)

(58) Field of Classification Search
CPC ............. F01M 13/023; F01M 13/0011; F01M 2013/0016; F16K 7/17; F16K 25/005; F16K 24/04; F16K 7/126; F16K 17/04
See application file for complete search history.

(56) References Cited

U.S. PATENT DOCUMENTS 4,720,079 A 1/1988 Iizuka
5,246,030 A * 9/1993 Jerina ................. F16K 17/0426
137/478
(Continued)

FOREIGN PATENT DOCUMENTS

EP 1375906 A2 1/2004
EP 2236781 A1 * 10/2010 ......... F01M 13/0011
(Continued)

*Primary Examiner* — Jacob M Amick
*Assistant Examiner* — Charles Brauch
(74) *Attorney, Agent, or Firm* — James Hasselbeck

(57) ABSTRACT

A switching membrane for a pressure control valve has a plate-shaped flat body with a central area and a bending area surrounding the central area. The central area is provided with a closure area. For switching the switching membrane, the central area can be moved back and forth by a bending movement of the bending area in a direction transverse to an extension of the central area. At least the bending area is made of fluorocarbon rubber. A pressure control valve, especially for crankcase ventilation, is provided with a valve housing that has a housing cover and further is provided with a valve seat. A switching membrane as described above is disposed in the valve housing and switches at pressure differences of at most 500 mbar to release or shut off a flow of fluid at the valve seat.

17 Claims, 4 Drawing Sheets

(51) Int. Cl.
    *F01M 13/00*     (2006.01)
    *F01M 13/02*     (2006.01)
    *F16K 17/04*     (2006.01)
    *F16K 24/04*     (2006.01)
    *F16K 25/00*     (2006.01)

(52) U.S. Cl.
    CPC ............... *F16K 7/17* (2013.01); *F16K 17/04* (2013.01); *F16K 24/04* (2013.01); *F16K 25/005* (2013.01); *F01M 2013/0016* (2013.01)

(56) References Cited

U.S. PATENT DOCUMENTS

| | | |
|---|---|---|
| 6,886,590 B2 | 5/2005 | Robinson et al. |
| 2005/0247354 A1* | 11/2005 | Hezel ................ F01M 13/0011 137/625.65 |
| 2010/0101225 A1* | 4/2010 | Christmann ........... F02M 26/56 60/602 |
| 2011/0174397 A1* | 7/2011 | Goerlich ............ F01M 13/0011 137/535 |
| 2014/0260089 A1* | 9/2014 | Luoma, II ............... B01L 3/523 53/396 |

FOREIGN PATENT DOCUMENTS

| | | |
|---|---|---|
| GB | 1165245 A | 9/1969 |
| JP | 2002343206 A | 11/2002 |

\* cited by examiner

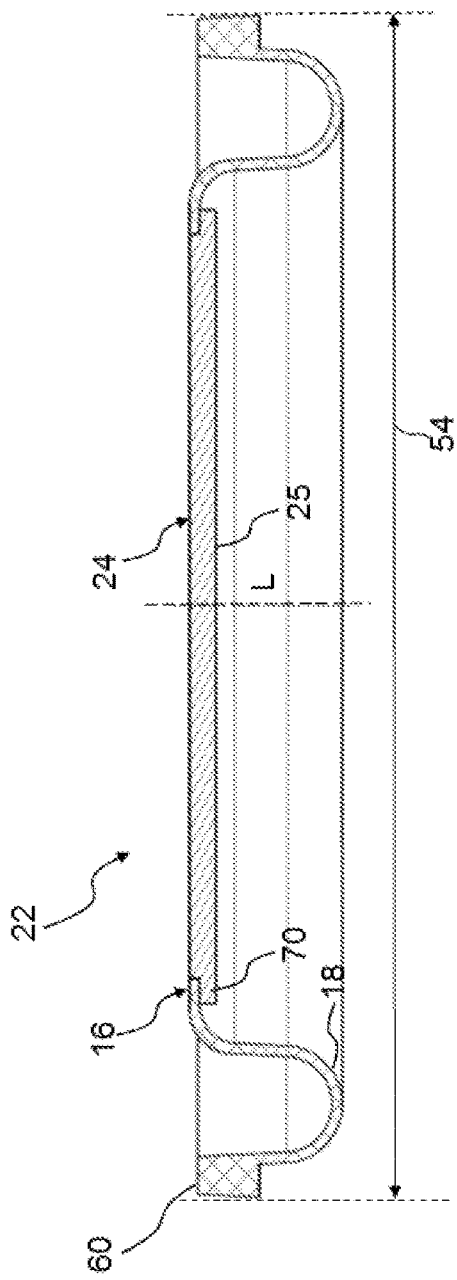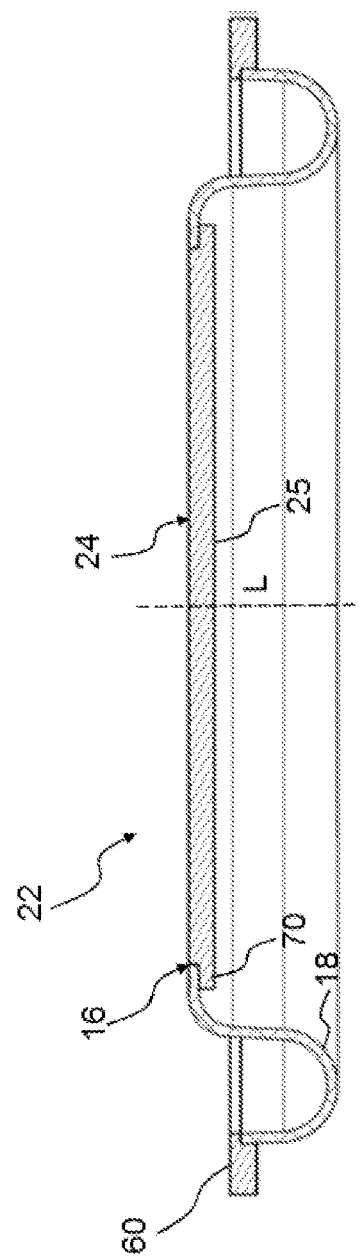

SWITCHING MEMBRANE FOR A PRESSURE CONTROL VALVE AND A PRESSURE CONTROL VALVE

BACKGROUND OF THE INVENTION

The invention concerns a switching membrane for a pressure control valve as well as a pressure control valve with a switching membrane for controlling or regulating a fluid pressure, in particular for the crankcase ventilation of the internal combustion engine of a motor vehicle.

Pressure control valves are, for example, employed in the venting line between crankcase and intake pipe or air filter of an internal combustion engine. In this context, the goal is to prevent an increase of pressure or vacuum in the containers to be vented past a predetermined value.

In internal combustion engines, blow-by gases are generated in that the combustion gases in the cylinder flow past the cylinder piston into the crankcase. These blow-by gases cause an increase of pressure in the crankcase and may cause leakages and escape of oil. In order to prevent a pressure increase and to discharge the blow-by gases in an environmentally friendly way, they are returned from the crankcase into the air intake manifold of the internal combustion engine. On the other hand, the vacuum should not drop significantly below a specified value because undesired leak air would be sucked into the crankcase due to leaks.

In the pressure control valves that are employed currently, usually a switching membrane of elastomer, often fluorosilicone rubber (FVMQ), is employed. These switching membranes are very flexible as a result of the specific properties of elastomers. As a function of the existing pressure conditions, this switching membrane opens or closes an opening in the pressure control valve. In this context, the switching membrane must react to minimal switching pressures of a magnitude of 100 mbar.

Blow-by gases are comprised of uncombusted fuel portions, motor oil portions, and other pollutants that are produced during combustion. These gases attack many elastomer types so that the material property may become damaged. The components made of these materials become brittle, porous, and cracked. When the switching membranes are damaged, the environmentally detrimental blow-by gases reach directly the environment because the system is no longer seal-tight. The switching membrane made of an elastomer is usually designed as a rolling membrane in order to realize a certain stroke of the membrane. Upon simultaneous contact with blow-by gases, the material is additionally mechanically loaded by the rolling movement within the rolling area and can become damaged in this way.

DE 26 29 621 A1 discloses a membrane valve with a membrane which is clamped at its edge between the valve housing and the housing cover and which, by means of a pressure member, is to be brought into seal-tight contact at a seat surface provided in the valve housing, wherein the membrane is comprised of a thinner layer of minimal elasticity, e.g., of PTFE, facing the housing interior and resistant to aggressive flow media, and a further thicker layer of rubbery-elastic material. Such membrane valves are used primarily where a high chemical resistance of the materials that are coming into contact with the flow medium is required. Since the rubbery-elastic materials do not fulfill these requirements and the chemically resistant materials such as PTFE however do not have the required elasticity for a proper function, membranes that are comprised of two layers are employed. By means of the thick rubber-like layer, the contact pressure that is exerted by the pressure member is transmitted as uniformly as possible onto the sealing surface of the membrane interacting with the seat surface in the valve housing. In this context, for closing the two layer membrane, relatively great pressures of several bars are applied to the membrane by means of a pressure spindle connected to a handwheel in order to ensure the required sealing function by means of the stiff PTFE layer despite the non-existing spring travel of the PTFE layer.

SUMMARY OF THE INVENTION

It is an object of the invention to provide a switching membrane for a pressure control valve for switching at low pressure differences which, in operation at an internal combustion engine with aggressive blow-by gases, achieves long service lives and can be manufactured at low cost.

A further object of the invention is to provide a pressure control valve with a switching membrane for switching at low pressure differences, which pressure control valve, in operation at an internal combustion engine with aggressive blow-by gases, achieves long service lives.

The aforementioned object is solved according to an aspect of the invention by a switching membrane comprising a plate-shaped flat body with a bending area surrounding a central area wherein at least the bending area comprises fluorocarbon rubber.

According to another aspect of the invention, the further object is solved by a pressure control valve comprising a switching membrane wherein at least the bending area of the switching membrane comprises fluorocarbon rubber.

Beneficial embodiments and advantages of the invention result from the further claims, the description, and the drawing.

A switching membrane for a pressure control valve is proposed, comprising a plate-shaped flat body with a bending area surrounding a central area, wherein the central area comprises a closure area, wherein, for switching the switching membrane, the central area is movable, by a bending movement of the bending area, back and forth in a direction transverse to the extension of the central area. In this context, at least the bending area comprises fluorocarbon rubber.

The switching membrane comprises the plate-shaped flat body comprising the bending area surrounding the central area, wherein the bending area moves during switching of the switching membrane toward or away from the valve seat. The central area represents on the other hand a relatively stiff area that maintains its shape upon movement of the switching membrane. Also, a rim area as a clamping area maintains its shape during the bending movement. The closure area can be an integral component of the central area and, for example, can be a radial inwardly positioned area of the central area. Alternatively, an additional element can be provided that is correlated with the closure area. In this way, the closure area can comprise a separate element that is inserted into the central area and in particular exhibits beneficial sealing properties. Alternatively, the closure area can be formed by a central inner area of the central area itself which is surrounded by a sealing element arranged in a groove of the central area.

According to the invention, a conventional switching membrane of elastomer of a conventional pressure control valve for the crankcase ventilation of an internal combustion engine is thus replaced by a switching membrane wherein at least the bending area is formed of fluorocarbon rubber. Other areas of the switching membrane can still be formed of conventional plastic materials such as polyamide (PA), for example, PA 6 filled with glass fiber. Also, polypropylene (PP) is usable for these areas.

The switching membrane with a bending area of fluorocarbon rubber is chemically resistant and can switch many switching cycles of the pressure control valve. Fluorocarbon rubber as a high performance material for the bending area makes it possible to configure the switching membrane with high flexibility so that the switching membrane exhibits an excellent switching behavior for control of the fluid pressure with the pressure control valve. The long-term stability of the switching membrane and thus also of the pressure control valve can be decisively improved with the high performance material fluorocarbon rubber.

Since only the bending area is formed of the expensive high performance fluorocarbon rubber and the remainder of the switching membrane is formed of inexpensive conventional plastic material, the switching membrane can be manufactured at low cost. The thickness of the bending area can be beneficially selected to be within the range of at most 1.0 mm, preferably of at most 0.7 mm, particular preferred of at most 0.5 mm.

According to an advantageous embodiment, the central area can be formed at least in sections thereof of plastic material. The central area can be advantageously designed as a stiff component and can thus be formed expediently of a conventional plastic material such as PA, also glass fiber reinforced, for example, or PP. In this way, it is ensured that the switching membrane with the closure area radially inwardly arranged in the central area can seal a valve seat of the pressure control valve reliably and exhibits a reliable switching behavior in this way.

According to an advantageous embodiment, a clamping area can extend radially outside of the bending area, which clamping area is formed of plastic material. The clamping area can also be comprised advantageously of a conventional plastic material such as PA, also glass fiber reinforced, for example, or PP. The clamping area serves for fixation of the switching membrane and sealing by compression in the housing of the pressure control valve, i.e., is not moved in operation but must only ensure a stable support function. This can be achieved in a beneficial way by embodying the clamping area of a hard plastic material.

According to an advantageous embodiment, the closure area can have a sealing area which at least in sections thereof is formed of fluorocarbon rubber. Since an inner sealing area is formed of a relatively flexible fluorocarbon rubber, a reliable sealing action on a tubular valve seat can be ensured. Due to such a sealing action with a soft material such as fluorocarbon rubber, also the noise level upon switching of the pressure control valve can be decisively reduced because a soft pressure application is realized by the sealing area when the closure area contacts the valve seat.

According to an advantageous embodiment, the sealing area can be formed to have an annular shape. Such a sealing area for a tubular valve seat can be realized in the closure area in a beneficial way by configuration of the sealing area in the form of a ring. In this way, the proportion of the relatively expensive high performance material fluorocarbon rubber for the sealing area can be reduced so that the switching membrane can be manufactured at low cost. In this way, the sealing area can be designed advantageously with precise fit for the valve seat.

According to an advantageous embodiment, the bending area can extend in radial direction as a corrugation about the central area. The bending area comprises in this context expediently at least one radially arranged corrugation about the central area wherein one or a plurality of corrugations as concavely and convexly extending curvature areas are formed with alternatingly arranged elevations and depressions of the switching membrane. In this context, an elevation at a flat face of the switching membrane corresponds to a depression on the other flat face of the switching membrane. In this way, a beneficial bending behavior with uniform force progression with simultaneous minimal stretching or no stretching of the switching membrane can be achieved, i.e., the central area of the switching membrane can be moved stretch-reduced or even stretch-free in axial direction due to the geometry of the bending area. Also, movements of the switching membrane at very small pressure differences between front and back of the membrane can be effected in this way.

According to an advantageous embodiment, the closure area can be designed as a cup-shaped protuberance of the central area. Due to the cup-shaped protuberance, a stable form of the central area is achieved so that a reliable sealing action upon contact of the closure area on the valve seat is ensured. In this context, the protuberance itself is not affected in its shape by the bending movement of the switching membrane and maintains its shape for a reliable sealing action.

According to an advantageous embodiment, the flat body can have in particular a diameter that measures between 40 mm and 100 mm, preferably between 50 mm and 80 mm. Switching membranes of the specified diameter achieve sufficient freedom of movement in order to achieve the desired control behavior in a pressure control valve for the desired low pressure differences. In this way, the venting valves for conventional internal combustion engines in the automotive field can be realized efficiently.

According to an advantageous embodiment, the switching membrane can be produced by a 2K (two shot) injection molding method. Such a production method is particularly advantageous because the component can thus be manufactured with one tool into which sequentially different materials are injected. In this way, also a beneficial connection between the areas of different materials can be created that allow to realize the entire component as one piece. One material can be fluorocarbon rubber while the other material is PA, in particular with a glass fiber proportion, or PP or similar plastic materials.

According to a further aspect of the invention, a pressure control valve for controlling or regulating a fluid pressure is proposed, comprising a valve housing comprising a housing cover as well as a switching membrane for switching at pressure differences of at most 500 mbar, preferably of at most 200 mbar, particularly preferred of at most 100 mbar, for releasing or shutting off a flow of the fluid. The switching membrane comprises a plate-shaped flat body, comprising a bending area surrounding a central area, wherein the central area comprises a closure area, wherein, during switching of the switching membrane, the bending area moves by a bending movement the central area relative to a valve seat in a direction transverse to the extension of the central area toward the valve seat or away from the valve seat. In this context, at least the bending area comprises fluorocarbon rubber.

By means of a spring element which is supported on the valve housing, a force is exerted on the switching membrane in this context in order to be able to adjust the control behavior of the pressure control valve in a suitable way. The outlet, for example, an outlet socket, comprises at an end which is arranged in the valve housing a valve seat which is closable by the closure area of the switching membrane so that a discharge of the fluid from an inlet to an outlet can be controlled.

The switching membrane can ensure the desired switching behavior by closing off the valve seat with the closure area.

The bending movement can be enabled in particular by the plate-shape configuration with radial corrugation-shaped areas of the switching membrane alone. Switching membranes of the specified diameter reach for conventional thicknesses of the bending area sufficient freedom of bending movement in order to achieve the desired control behavior in a pressure control valve at the desired low pressure differences. In this way, venting valves for conventional internal combustion engines in the automotive field can be realized efficiently.

According to an advantageous embodiment, a spring element can be provided which is supported on the valve housing and exerts a force on the central area of the switching membrane. The spring element exerts in this context the suitable counterforce on the switching membrane in order to reach the control behavior of the pressure control valve in the desired pressure range. The face of the switching membrane which is facing away from the fluid to be controlled is loaded conventionally with atmospheric pressure in this context.

According to an advantageous embodiment, the spring element can be supported on the central area. In particular when the central area is formed of a plastic material such as PA (polyamide) or PP (polypropylene), a stable support of the spring element on the switching membrane is achieved so that a defined force introduction into the switching membrane is ensured. At the same time, the switching membrane is protected from possible damage of the bending area by the spring element.

According to an advantageous embodiment, the closure area can be designed as a cup-shaped protuberance of the central area, wherein the spring element is arranged about the cup-shaped protuberance. In this way, a uniform force introduction from the spring element into the switching membrane is achieved wherein the closure area which is formed as a protuberance out of the central area is not affected in its shape by the force introduction. This is ensured in particular when a plate of the spring element is placed in annular shape about the protuberance so that the plate additionally stabilizes the form of the protuberance. In this context, the protuberance as closure area is arranged in an inner area of the spring element.

Moreover, it is advantageous when the spring element at its end face which is facing the protuberance is embedded by injection molding. Also, a realization of a plate of the spring element in the form of an injection molded part of plastic material as a support surface on the switching membrane can very expediently and beneficially provide a connection of the spring element with the switching membrane. Moreover, in this way the bending area of the switching membrane is additionally protected against mechanical loading in the area of the spring element.

According to an advantageous embodiment, a first chamber can be loadable with atmospheric pressure as control pressure. For an effective control behavior of the pressure control valve, the switching membrane should be able to move as freely as possible, for which purpose a first chamber, which is separated by the switching membrane from a second chamber in which the fluid to be controlled is located, is expediently in communication with the environment, i.e., the atmospheric pressure. The spring element compensates in this context the atmospheric pressures so that the control behavior of the switching membrane can be realized in a low pressure difference range.

According to a further aspect of the invention, the pressure control valve according to the invention is used for crankcase venting of an internal combustion engine.

BRIEF DESCRIPTION OF THE DRAWINGS

Further advantages result from the following description of the drawings.

In the drawings, embodiments of the invention are illustrated. The drawings, the description, and the claims contain numerous features in combination. A person of skill in the art will consider the features expediently also individually and combine them to other meaningful combinations.

FIG. 1 shows a switching membrane according to an embodiment of the invention with a central area of plastic material in a section illustration.

FIG. 2 shows a switching membrane according to a further embodiment of the invention additionally provided with a clamping area of plastic material, in a section illustration.

DESCRIPTION OF PREFERRED EMBODIMENTS

Figure 3:
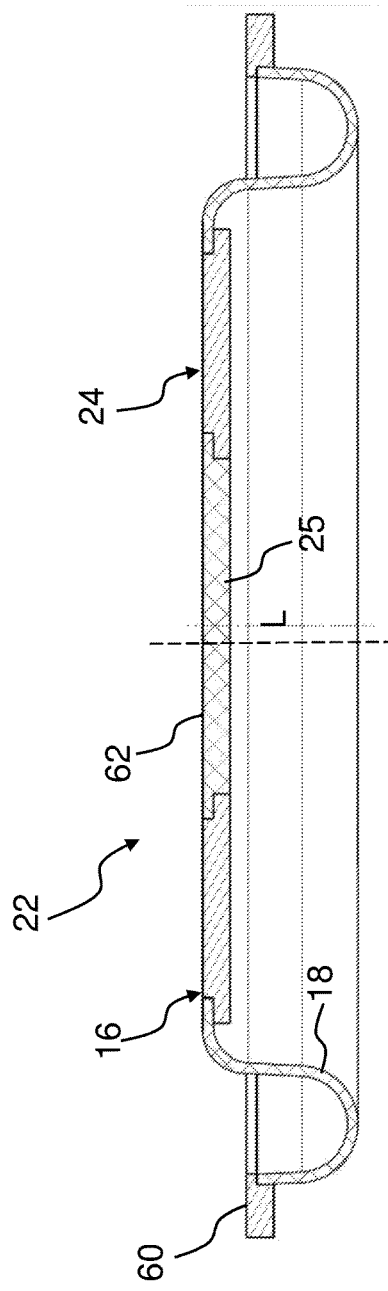
FIG. 3 shows in section illustration a switching membrane according to a further embodiment of the invention with a central area of plastic material in which radially inwardly a sealing area of fluorocarbon rubber is arranged as a closure area.

In the Figures, same or same type components are identified with same reference characters. The Figures show only examples and are not to be understood as limiting.

FIG. 1 shows a switching membrane 22 for a pressure control valve 10 according to an embodiment of the invention with a central area 24 of plastic material in section illustration. The pressure control valve 10 is illustrated in an exemplary fashion in FIG. 7.

The switching membrane 22 comprises a plate-shaped flat body 16 received into and closing a central opening of a flexible ring member formed as a bending area 18 surrounding a central area 24 of the plate-shaped flat body 16, wherein the central area 24 comprises a radial inner closure area 25. The central area 24 is movable back and forth for switching of the switching membrane 22 by a bending movement of the bending area 18 in the direction L transverse to the extension of the central area 24. The plate-shaped flat body 16 has a radially projecting lip 70 extending over and connected to the flexible ring membrane 18. The bending area 18 is formed of fluorocarbon rubber. The central area 24 is formed as a flat plate of plastic materials such as PA, in particular glass fiber reinforced, or PP or a similar plastic material. The bending area 18 extends in a corrugation shape in radial direction and forms a corrugation about the central area 24.

Manufacture of the switching membrane 22 can be realized advantageously by a 2K (two-shot) injection molding method wherein fluorocarbon rubber and a plastic material such as PA, in particular glass fiber reinforced PA, or PP are employed as material components.

The flat body 16 has in particular a diameter 54 between 40 mm and 100 mm, preferably between 50 mm and 80 mm. In this way, it is ensured that the switching membrane 22 reliably seals a valve seat 32 of the pressure control valve 22 and provides a reliable switching behavior in this way.

FIG. 2 shows in section illustration a switching membrane 22 according to a further embodiment of the invention in addition provided with a clamping area 60 of plastic material. The clamping area 60 which is extending radially outside of the bending area 18, can be made, for example, of plastic materials such as PA or PP. In this way, the clamping area 60 can be fixedly compressed by the housing body 12 and housing cover 14 of the valve housing of the pressure control valve 10 for sealing in order to generate a reliable sealing action over the service life.

FIG. 3 shows in section illustration a switching membrane 22 according to a further embodiment of the invention with a central area 24 of plastic material in which radially inwardly a sealing area 62 of fluorocarbon rubber is arranged as a closure area 25. Since the inner sealing area 62 is formed of a relatively flexible fluorocarbon rubber, a reliable sealing action on a tubular valve seat 32 (see FIG. 7) is ensured. With such a sealing action with a soft material such as fluorocarbon rubber, also the noise level upon switching of the pressure control valve 22 can be decisively reduced because a soft pressure application is realized when the closure area 25 contacts the valve seat 32.

Figure 4:
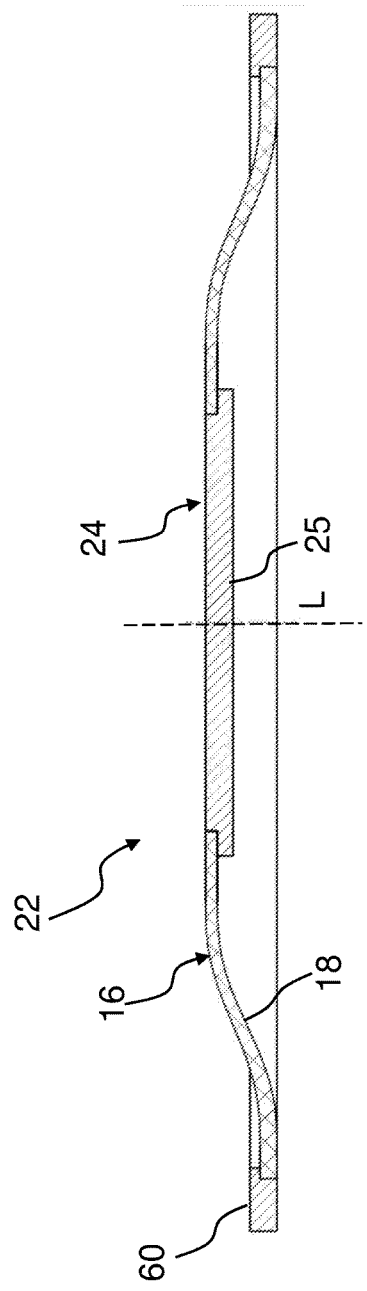
FIG. 4 shows a switching membrane according to a further embodiment of the invention with a flat bending area in section illustration.

FIG. 4 shows a switching membrane 22 according to a further embodiment of the invention with a flat bending area 18 in section illustration. In this way, a particularly flat configuration of a pressure control valve 10 can be realized in which the switching membrane 22 carries out relatively minimal strokes in the direction of axis L. Despite of this, a reliable control behavior can be achieved in this way with such a switching membrane 22.

Figure 5:
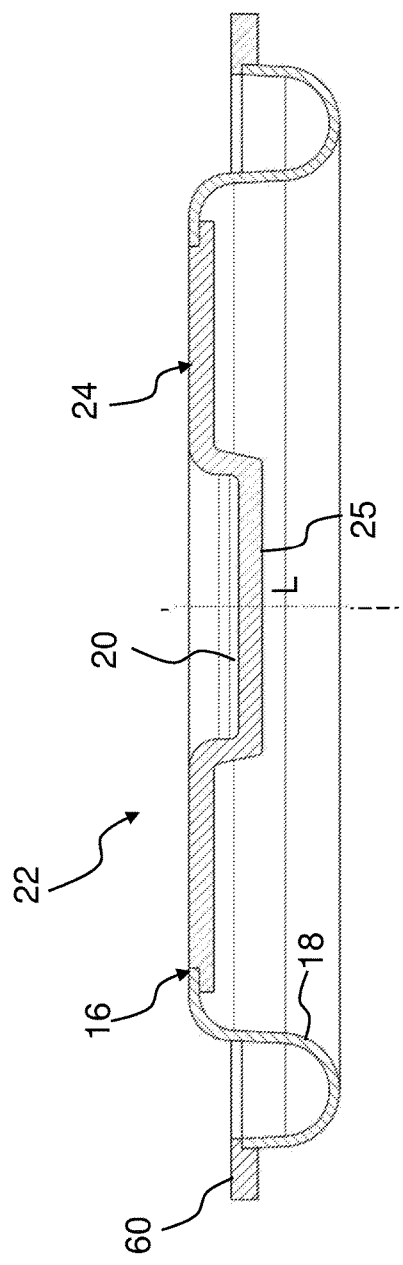
FIG. 5 shows in section illustration a switching membrane according to a further embodiment of the invention with a cup-shaped protuberance closure area.

In FIG. 5, a switching membrane 22 according to a further embodiment of the invention with a cup-shaped protuberance 20 of the closure area 25 is shown in section illustration. Due to the cup-shaped protuberances 20 a stable shape of the central area 24 is achieved so that a reliable sealing action upon contacting of the closure area 25 on the valve seat 32 can be ensured. The protuberance 20 itself is not affected in its shape by the bending movement of the switching membrane 22 and maintains the shape for the reliable sealing effect.

Figure 6:
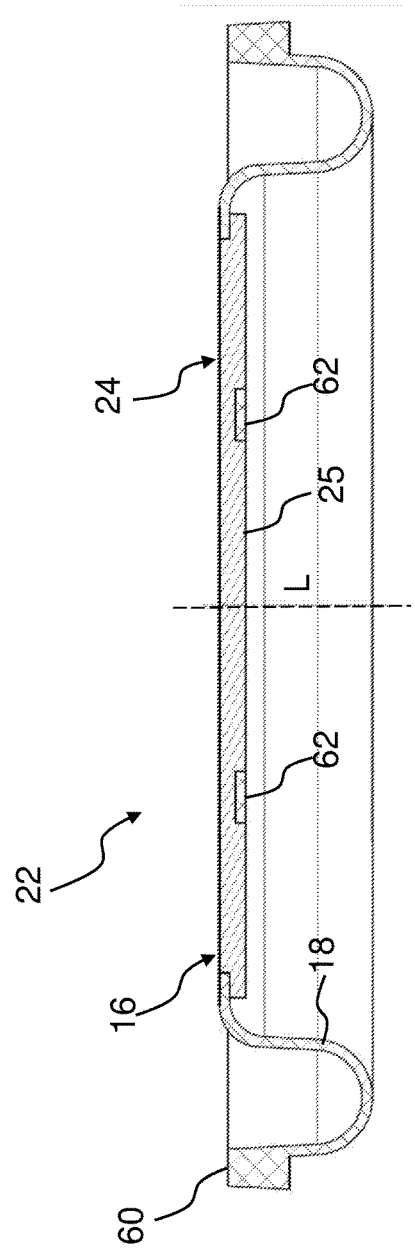
FIG. 6 shows, in section illustration, a switching membrane according to a further embodiment of the invention with a sealing area arranged in an annular shape in the closure area.

In FIG. 6, in section illustration, a switching membrane 22 according to a further embodiment of the invention is illustrated with a sealing area 62 arranged in annular shape in the closure area 25. Such a sealing area 62 for a tubular valve seat 32 can be realized in a beneficial way by configuration of the sealing area 62 in the form of a ring in the closure area 25. In this way, the proportion of the relatively expensive high performance material fluorocarbon rubber for the sealing area 62 can be reduced so that the switching membrane 22 can be manufactured at low cost. In this way, a sealing area 62 can advantageously be designed with precise fit for the valve seat 32.

Figure 7:
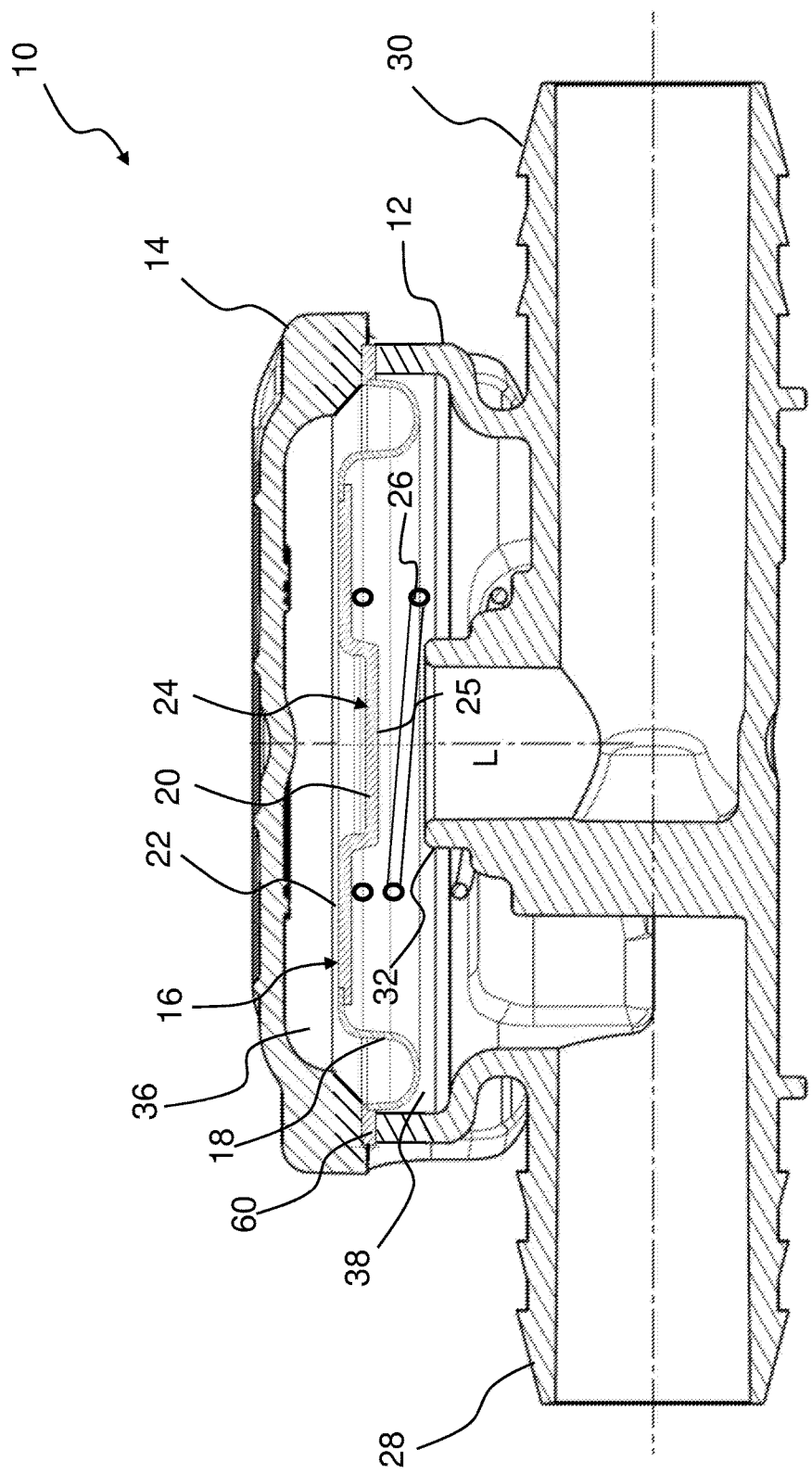
FIG. 7 shows a pressure control valve with a switching membrane according to an embodiment of the invention in a section illustration.

FIG. 7 shows in a section illustration a pressure control valve 10 with a switching membrane 22 according to an embodiment of the invention. The pressure control valve 10 serves for control or regulation of a fluid pressure, in particular for use for crankcase ventilation of an internal combustion engine. The pressure control valve 10 comprises a valve housing with a housing body 12 and a housing cover 14 wherein the valve housing comprises an inlet 28 embodied as an inlet socket and an outlet 30 for the fluid designed as an outlet socket. The switching membrane 22 can be moved with pressure differences of at most 500 mbar, preferably of at most 200 mbar, particularly preferred of at most 100 mbar, and serves for releasing or shutting off a flow of the fluid between the inlet 28 and the outlet 30.

The switching membrane 22 comprises a plate-shaped flat body 16 with a bending area 18 surrounding a central closure area 24, wherein the central area 24 comprises a radial inner closure area 25. Upon switching of the switching membrane 22, the bending area 18 moves by a bending movement the central area 24 relative to the valve seat 32 in axial direction L transverse to the extension of the central area 24 toward the valve seat 32 or away from the valve seat 32.

The switching membrane 22 has for this purpose at least in the bending area 18 a thickness of at most 1.0 mm, preferably of at most 0.7 mm, particularly preferred of at most 0.5 mm. In this context, the diameter of the switching membrane 22 is, for example, between 40 mm and 100 mm, preferably between 50 mm and 80 mm.

The switching membrane 22 is formed in the bending area 18 of fluorocarbon rubber and is clamped with a clamping area 60 between housing body 12 and the housing cover 14 of the valve housing. The switching membrane 22 separates a first chamber 36 from a second chamber 38, wherein the first chamber 36 is in communication (not illustrated) with the environment, i.e., the atmospheric pressure. In the situation of use, the inlet 28 of the pressure control valve 10 is connected fluidically, for example, with the crankcase of an internal combustion engine, while the outlet 30 is fluidically connected with the intake manifold.

The bending area 18 extends in radial direction in a corrugation shape, in the illustrated embodiment forms a corrugation about the central area 24, wherein a depression on one flat face corresponds to an elevation on the other flat face of the switching membrane 22. The closure area 25 closes off the valve seat 32 fluid-tightly when it is resting against the valve seat 32.

A spring element 26 is provided which is supported on the housing body 12 and which exerts a force on the central area 24 of the switching membrane 22 and in this way compensates the atmospheric pressure in the first chamber 36. The closure area 25 is formed as a cup-shaped protuberance 20 of the switching membrane 22. The spring element 26, surrounding the cup-shaped protuberance 20 that is extending into the interior of the spring element 26, is supported on the central area 24. Also, the end face of the spring element 26 which is facing the protuberance 20 may be embedded by injection molding for protection of the switching membrane 22 so that embedding protects the central area 24 from abrasion or other wear.

Advantageously, the pressure control valve can be used for crankcase ventilation of an internal combustion engine.

While specific embodiments of the invention have been shown and described in detail to illustrate the inventive principles, it will be understood that the invention may be embodied otherwise without departing from such principles.

What is claimed is:

1. A switching membrane for a pressure control valve, the switching membrane comprising;

a plate-shaped flat body comprising a plastic material, the plate-shaped flat body having a circumferential outer edge, a flexible ring member having a central opening, the flexible ring member forming a ring-shaped bending area which surrounds the central opening of the flexible ring member, wherein the plate-shaped flat body is received into and completely closes the central opening, the circumferential outer edge of the plate-shaped flat body having a radially projecting lip extending over the flexible ring member and connected to the flexible ring member, wherein the plate-shaped flat body forms a closed central area of the switching membrane, wherein the plate-shaped flat body comprises a closure area for closing against a valve seat;

wherein, for switching the switching membrane, the central area is configured to be moved back and forth by a bending movement of the bending area of the flexible ring member in a direction transverse to an extension of the plate-shaped flat body;

wherein the flexible ring member forming the ring-shaped bending area comprises fluorocarbon rubber.

2. The switching membrane according to claim 1, wherein the flexible ring further comprises
   a clamping area extending radially outside of the bending area,
      wherein the clamping area is comprised of plastic material.

3. The switching membrane according to claim 1, wherein the closure area of the plate-shaped flat body comprises a sealing area having a seal arranged on the plate-shaped flat body comprised at least partially of fluorocarbon rubber.

4. The switching membrane according to claim 3, wherein the seal in the sealing area is a seal ring having an annular shape.

5. The switching membrane according to claim 1, wherein the bending area extends in a radial direction as a corrugation about the central opening of the flexible ring member.

6. The switching membrane according to claim 1, wherein the closure area is a cup-shaped protuberance of the central area, the cup shaped protuberance formed as a projection on a side of the plate-shaped flat body facing the valve seat.

7. The switching membrane according to claim 1, wherein the plate-shaped flat body has a diameter measuring between 40 mm and 100 mm.

8. The switching membrane according to claim 7, wherein the diameter measures between 50 mm and 80 mm.

9. The switching membrane according to claim 1, produced by two-shot injection molding.

10. A pressure control valve for control or regulation of a fluid pressure, the pressure control valve comprising:
   a valve housing comprising
      a housing body and
      a housing cover,
      wherein the housing body comprises a valve seat;
   a switching membrane disposed inside the valve housing and configured to switch at pressure differences of at most 500 mbar to release or shut off a flow of fluid at the valve seat;
   the switching membrane comprising
      a plate-shaped flat body comprising a plastic material, the plate-shaped flat body having a circumferential outer edge,
      a flexible ring member having a central opening, the flexible ring member forming a ring-shaped bending area which surrounds the central opening of the flexible ring member,
      wherein the plate-shaped flat body is received into and closes the central opening, the circumferential outer edge of the plate-shaped flat body having a radially projecting lip extending over the flexible ring member and connected to the flexible ring member
      wherein the plate-shaped flat body forms a central area of the switching membrane,
   wherein, upon switching of the switching membrane, the bending area of the flexible ring member by a bending movement moves the central area relative to the valve seat in a direction transverse to an extension of the plate-shaped flat body toward the valve seat or away from the valve seat, and wherein the flexible ring member forming the ring-shaped bending area comprises fluorocarbon rubber.

11. The pressure control valve according to claim 10, further comprising
   a spring element supported on the valve housing and exerting a force on the central area of the plate-shaped flat body of the switching membrane.

12. The pressure control valve according to claim 11, wherein
   the spring element is supported on the central area.

13. The pressure control valve according to claim 11, wherein
   the closure area is a cup-shaped protuberance of the central area, the cup shaped protuberance formed as a projection on a side of the plate-shaped flat body facing the valve seat,
   wherein the spring element is arranged about the cup-shaped protuberance.

14. The pressure control valve according to claim 10, wherein
   a chamber of the valve housing is loadable with atmospheric pressure as control pressure.

15. The pressure control valve according to claim 10, wherein
   the switching membrane is configured to switch at pressure differences of at most 200 mbar.

16. The pressure control valve according to claim 15, wherein
   the switching membrane is configured to switch at pressure differences of at most 100 mbar.

17. The pressure control valve according to claim 10, configured for crankcase ventilation of an internal combustion engine.

\* \* \* \* \*